United States Patent [19]

Winkler et al.

[11] 3,893,139
[45] July 1, 1975

[54] PHOTOGRAPHIC APPARATUS WITH EXPANSIBLE HOUSING

[75] Inventors: Alfred Winkler, Munich; Dieter Engelsmann, Unterhaching; Rolf Schröder, Baldham, all of Germany

[73] Assignee: Agfa-Gevaert Aktiengesellschaft, Leverkusen, Germany

[22] Filed: July 23, 1974

[21] Appl. No.: 491,143

[30] Foreign Application Priority Data
July 31, 1973 Germany............................ 2338776

[52] U.S. Cl. ................ 354/288; 354/187; 354/204; 354/354
[51] Int. Cl.² ........................................ G03B 17/02
[58] Field of Search .......... 354/288, 204, 202, 187, 354/191, 354

[56] References Cited
UNITED STATES PATENTS
2,169,548  8/1939  Zapp................................. 354/172
3,680,455  8/1972  Meinunger........................ 354/187
3,750,549  8/1973  Waaske............................ 354/354 X

*Primary Examiner*—Richard L. Moses
*Attorney, Agent, or Firm*—Michael S. Striker

[57] ABSTRACT

A still camera wherein the main section of the housing guides a reciprocable cover member of the housing. The cover member is movable between an extended position and a concealing position and is permanently biased to the extended position by one or more aligned torsion springs each having a first leg bearing against the outer side of one end wall of the main section, a second leg bearing against the inner side of an end wall of the cover member, and one or more helices which connect the two legs and are unsupported in a compartment between the two end walls. A rivet which serves to maintain the helices of the springs in register with each other has a shank and two spaced-apart flanges. The helices surround the shank in the space between the two flanges. The cover member is used to actuate the film transporting mechanism and/or to actuate the shutter in the main section of the housing.

10 Claims, 3 Drawing Figures

PHOTOGRAPHIC APPARATUS WITH EXPANSIBLE HOUSING

CROSS-REFERENCE TO RELATED APPLICATION

The photographic apparatus of the present invention constitutes an improvement over and a further development of photographic apparatus which are disclosed in the commonly owned copending application Ser. No. 344,366 filed Mar. 23, 1973 now U.S. Pat. No. 3,864,705 by Alfred Winkler.

BACKGROUND OF THE INVENTION

The present invention relates to photographic apparatus in general, especially to still cameras, and more particularly to improvements in photographic apparatus with expansible and contractible housings.

The copending application Ser. No. 344,366 of Winkler discloses a still camera wherein a prismatic main section of the housing mounts the picture taking lens, the film transporting mechanism, the shutter, the view finder, and has a chamber for reception of photographic film, preferably for reception of a cassette containing a roll of photographic film. A second section is mounted on and is movable back and forth relative to the main section, or vice versa, whereby the second section overlies and conceals the lens and the view finder in one of its end positions in which the dimensions of the housing are reduced to a minimum. When the second section of the housing is moved to a second position, the length of the housing reaches a maximum value and the picture taking lens as well as the view finder are exposed so that the camera is ready to take pictures. The second section has toothed racks or analogous means for cocking the shutter and/or for actuating the film transporting mechanism during movement from the first to the second end position or vice versa. The camera further comprises a helical spring which permanently urges the second section of the housing to its extended position. An arresting device is provided to hold the second section in the first end position against the opposition of the helical spring when the camera is not in use, e.g., during storage of the camera in a carrying case.

It has been found that a helical spring is not an ideal means for biasing the second section of the housing to its second end position. The characteristic curve of a helical spring changes pronouncedly during movement of the second section between the two end positions and, as a rule, the main section must carry a rod-like guide which is surrounded by the helical spring and must extend from the main section to properly guide that part of the spring which is adjacent to the locus where the spring bears against the second section.

SUMMARY OF THE INVENTION

An object of the invention is to provide a photographic apparatus having an expansible housing with novel and improved means for biasing the sections of the housing to predetermined positions with respect to each other.

Another object of the invention is to provide a biasing means which occupies little room so that it contributes negligibly to the bulk of the photographic apparatus, which employs one or more springs having flat characteristic curves, and whose spring or springs are simple, inexpensive, long-lasting and readily insertable into or removable from the housing.

A further object of the invention is to provide the photographic apparatus with novel and improved means for biasing the housing sections to such positions in which the apparatus is ready to make an exposure.

The invention is embodied in a photographic apparatus, particularly in a still camera, which comprises a housing including a first section and a second section which is supported by and is reciprocable relative to the first section between first and second positions in which one of the sections respectively conceals and exposes a portion of the other section (e.g., the second section may respectively conceal and expose that portion of the first section which mounts the view finder and/or the objective of the camera), and novel and improved means for biasing the second section to one of its positions, preferably to its second position. In accordance with a feature of the invention, the biasing means comprises at least one torsion spring having first and second legs which respectively bear against the first and second sections of the housing and an unsupported arcuate portion (which may form a loop or one or more helices) which connects the legs to each other and is disposed in a compartment defined by the two sections. If the arcuate portion of the torsion spring forms at least one helix, and especially if the arcuate portion forms two or more helices, the apparatus preferably further comprises a rivet having a shank or stem which is surrounded by the helix or helices and two spaced apart flanges which extend radially from the shank. The helix or helices surround the shank in the space between the two flanges.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
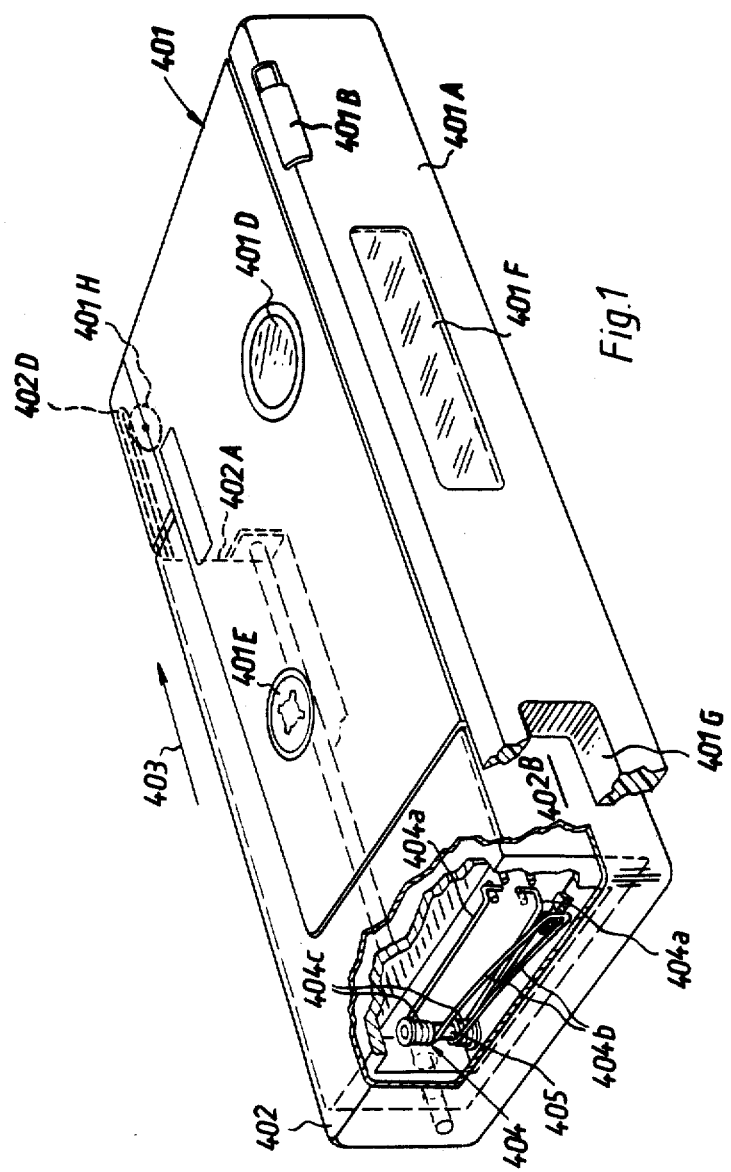
FIG. 1 is a fragmentary perspective view of a still camera wherein the second section of the housing is movable to its second position by a biasing means which comprises two torsion springs, the second section being shown in its first position.

Referring first to FIG. 1, there is shown a flat prismatic miniature still camera which comprises a housing or body having a first or main section 401 and a second section or cover portion 402. The main section 401 includes a pivotable rear wall or door 401A which is normally held in the illustrated closed or seating position by a locking device 401B and can be pivoted to an open position to afford access to a chamber (not shown) for a cassette containing a roll of photographic film. The picture taking lens is installed in the front wall of the main section 401 (opposite the door 401A) and is in register with a suitable shutter, not shown. The main section 401 further carries a release having a deformable membrane 401D and an indexible socket 401E which can receive the base of a multiple flash lamp holder, e.g., a holder of the type known as Magicube or Flashcube (both trademarks). A window 401F in the door 401A allows for observation of numerals which are provided on the backing paper for the film in the housing and which indicate the number of exposed or unexposed film frames. A view finder (not shown) in the main section 401 is installed in front of an opening 401G in the door 401A.

Figure 3:
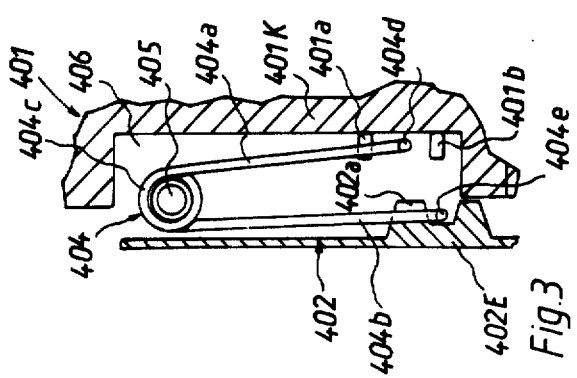
FIG. 3 is a fragmentary plan view of the left-hand portion of the structure shown in FIG. 1.
Figure 2:
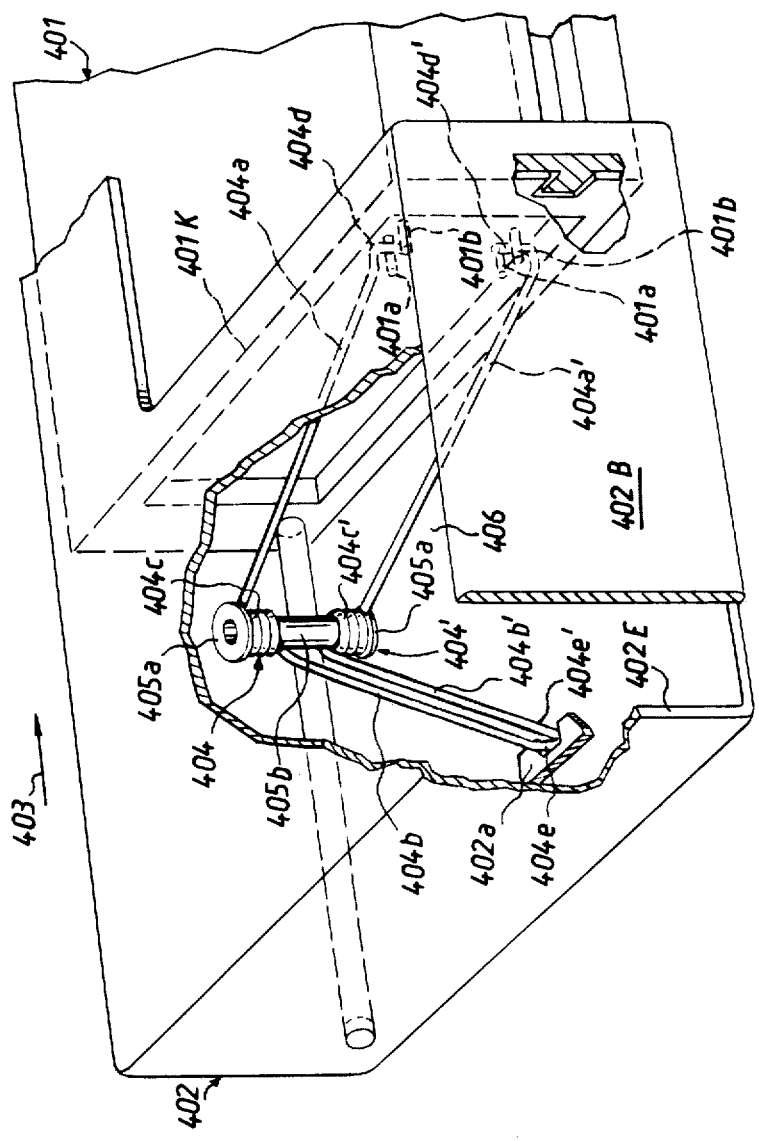
FIG. 2 is an enlarged view of the structure in the left-hand portion of FIG. 1 but showing the second section of the housing in its second position.

The second section or cover portion 402 has a front wall 402A which conceals the picture taking lens in the front wall of the main section 401 when the section 402 assumes the first end position shown in FIG. 1 or 3. At the same time, a rear wall 402B of the section 402 extends in front of the opening 401G so that the view finder in the section 401 is fully concealed between the walls 402A and 402B. The wall 402A has an opening (not shown but preferably resembling the opening 401G) which registers with the view finder when the section 402 assumes a second end position which is shown in FIG. 2. The rear wall 402B is then located to the left of the opening 401G so that the user of the camera can look through the view finder to observe the scene or subject to be photographed.

The front wall 402A of the second section 402 has a rack 402D which serves as a means for actuating a film transporting mechanism in the main section 401. Such film transporting mechanism includes a pinion 401H which meshes with the rack 402D and transports the film by the length of a frame while the section 402 moves in or counter to the direction indicated by an arrow 403. A similar rack (or the rack 402D) on the front wall 402A of the second section 402 serves as a means for actuating the shutter in the section 401, e.g., for cocking the shutter while the section 402 moves counter to the direction indicated by the arrow 403.

In accordance with a feature of the invention, the means for biasing the second section 402 to one of its end positions (or for biasing the section 401 to a predetermined position relative to the section 402) comprises at least one torsion spring which is installed in a compartment 406 between the left-hand end wall 402E of the section 402 and the left-hand end wall 401K of the section 401. In the illustrated embodiment, the biasing means comprises two aligned torsion springs 404, 404' each having a first leg 404a, 404a' bearing against the end wall 401K and a second leg 404b, 404b' bearing against the end wall 402E. Each of the torsion springs 404, 404' further comprises an arcuate intermediate portion 404c, 404c'. The arcuate portion 404c and/or 404c' can form a single loop (such as the loop between the legs of a hairpin spring) or one or more convolutions or helices. Each of the intermediate portions 404c, 404c' comprises three helices and the camera comprises an aligning device in the form of a rivet 405 having a shank or stem 405b and two spaced-apart flanges 405a which extend radially from the shank 405b. The helices of the intermediate portions 404c, 404 c' surround the shank 405b between the two flanges 405a. It will be noted that the intermediate portions 404c, 404c' are unsupported, i.e., they can be said to "float" between the end walls 401K, 402D. The bent-over end portions 404d, 404d' of the legs 404a, 404a' extend into the spaces between pairs of anchoring pins or retainers 401a, 401b on the end wall 401K, and the bent-over end portions 404e, 404e' of the legs 404b, 404b' extend into a socket of a forked second anchoring means 402a on the wall 402E.

It will be noted that the torsion springs 404, 404' are mounted in such a way that they tend to urge the section 402 in a direction to the left or the section 401 in a direction to the right, as viewed in FIG. 1 or 2. Thus, the section 402 will move to the left if the section 401 is held by hand, and the section 401 will move to the right if the section 402 is held by hand. Therefore, all an operator has to do upon completion of an exposure is to move the section 402 in the direction indicated by the arrow 403 and to thereupon relax the pressure upon the section 402 so that the torsion springs 404, 404' can return the section 402 to the second end position shown in FIG. 1 or 2. Such movement of the section 402 relative to the section 401 (or vice versa if the section 402 is held by hand) causes the rack 402D to actuate the film transporting mechanism so that the latter moves the foremost unexposed film frame behind the picture taking lens and/or to actuate the shutter so that the shutter is cocked and the camera can make the next exposure in response to deformation of the membrane 401D as soon as the sections 401, 402 reassume the positions shown in FIG. 1 or 2.

As disclosed in the copending application Ser. No. 344,366 of Winkler, the camera further comprises an arresting device which can be actuated to releasably hold the section 402 in the position of FIG. 3, i.e., in that end position in which the front wall 402A overlies the front end of the view finder and the picture taking lens and the rear wall 402B is located in front of the opening 401G. This reduces the length of the housing to a minimum so that the housing can be stored in a small carrying case or inserted into a pocket. It is clear that the wall 402A, the wall 402B and/or a further wall of the section 402 can conceal one or more additional component parts on or in the main section 401 when the section 402 assumes the position shown in FIG. 3.

The aforementioned arresting device for holding the section 402 in the position of FIG. 3 is deactivated when the operator contemplates to use the camera. This insures that the torsion springs 404, 404' can automatically move and maintain the sections 401, 402 in the positions shown in FIGS. 1 and 2. Consequently, the operator can make exposures in quick succession because all he has to do is to move the end walls 401K, 402E toward each other upon completion of each exposure and to thereupon allow the torsion springs 404, 404' to move the end walls 401K, 402E away from each other. This cocks the shutter and/or causes the film transporting mechanism to advance the film by the length of a frame. At the same time, the section 402 allows for an observation of the subject or scene by looking through the opening 401G in the door 401A of the section 401.

The provision of two or more torsion springs is desirable in order to effect a more uniform distribution of stresses upon the walls 401K, 402E, i.e., to reduce the likelihood of tilting of the section 402 relative to the section 401 or vice versa. The rivet 405 maintains the intermediate portions 404c, 404c' in exact register with each other and prevents undesirable deformation of such intermediate portions in response to repeated shifting of the sections 401, 402 with respect to each other. The flanges 405a hold the portions 404c, 404c' against movement away from each other, i.e., axially of the shank 405b. The rivet 405 sways back and forth in response to movement of the sections 401, 402 relative to each other (compare the positions of intermediate portions 404c, 404c' in FIGS. 2 and 3).

An advantage of torsion springs is that they take up very little room so that the width of the compartment 406 (as considered in the direction of arrow 403) need not appreciably exceed the diameters of helices of the intermediate portion 404c or 404c' when the width of the compartment 406 is reduced to a minimum as shown in FIG. 3. Another advantage of torsion springs is that their bias does not change abruptly when the sections 401, 402 are moved relative to each other, i.e., the operator does not encounter pronounced and abrupt changes in the magnitude of force with which the springs 404, 404' oppose the movement of section 402 in the direction indicated by the arrow 403. It is clear that the torsion springs can be inverted so that their intermediate portions 404c, 404c' are nearer to the rear wall 402B of the section 402. It is also within the purview of the invention to mount the spring 404 or 404' in a manner as shown in the drawing and to mount the spring 404' or 404 in such a way that its intermediate portion is nearer to the wall 402B.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, particularly in a still camera, a combination comprising a housing including a first section and a second section supported by and reciprocable relative to said first section between first and second positions in which one of said sections respectively conceals and exposes a portion of the other of said sections; and means for biasing said second section to one of said positions, including at least one torsion spring having first and second legs respectively bearing against said first and second sections and an unsupported arcuate portion connecting said legs and being disposed between said sections.

2. A combination as defined in claim 1, wherein said arcuate portion of said torsion spring forms at least one helix, and further comprising a rivet having a shank extending through said helix and spaced-apart flanges extending radially from said shank, said helix surrounding said shank intermediate said flanges.

3. A combination as defined in claim 1, wherein said biasing means comprises several torsion springs.

4. A combination as defined in claim 3, wherein the arcuate portion of each of said springs forms at least one helix, and further comprising a rivet having a shank extending through said helices and two spaced-apart flanges extending radially from said shank, said helices being disposed between said flanges.

5. A combination as defined in claim 1, wherein said one position of said second section is said second position.

6. A combination as defined in claim 5, further comprising film transporting means in said first section, said second section including a device for actuating said film transporting means in response to movement of said second section between said first and second positions.

7. A combination as defined in claim 5, wherein said sections define a compartment having a greater first width in said second position and a lesser second width in said first position of said second section, said first and second sections respectively having first and second walls flanking said compartment and said biasing means being located in said compartment.

8. A combination as defined in claim 7, wherein each of said walls has anchoring means for the respective legs of said spring.

9. A combination as defined in claim 7, wherein said second wall is disposed at one end of said second section, as considered in the direction of reciprocatory movement of said second section.

10. A combination as defined in claim 1, further comprising a shutter mounted in said first section, said second section comprising means for actuating said shutter in response to movement of said second section between said positions.

* * * * *